July 10, 1962 L. R. BOYD ETAL 3,043,954
FISSION CHAMBER ASSEMBLY
Filed Oct. 12, 1959
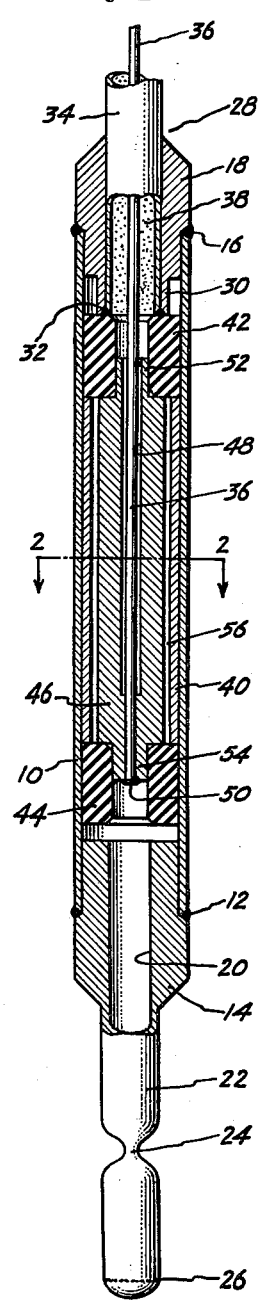
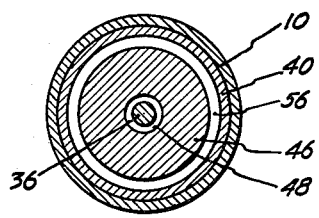
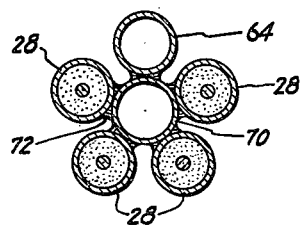
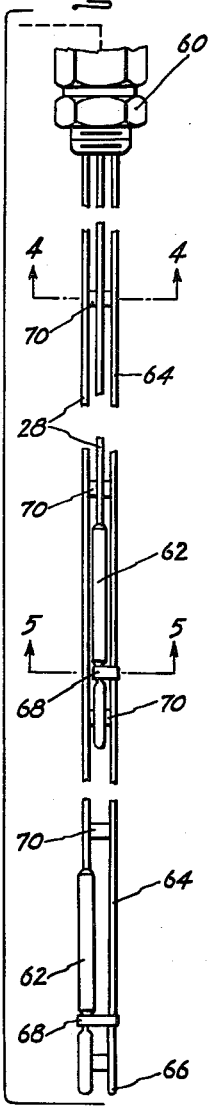
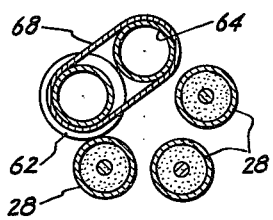
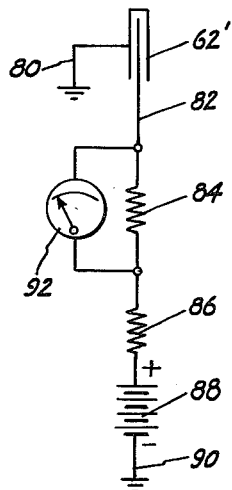
Inventors:
Richard G. Bock,
Leo R. Boyd,
by
Attorney.

cc# 3,043,954
FISSION CHAMBER ASSEMBLY
Leo R. Boyd and Richard G. Bock, San Jose, Calif., assignors to General Electric Company, a corporation of New York
Filed Oct. 12, 1959, Ser. No. 845,885
5 Claims. (Cl. 250—83.1)

This invention relates to the detection and measurement of the neutron fluxes by means of ion or fission chambers, and it particularly relates to an assembly containing a plurality of such devices spaced apart from one another and adapted for insertion through a channel in a nuclear chain reacting assembly or core of a nuclear reactor or through a channel through any other region in order to monitor continually and reliably the neutron flux at a plurality of points.

Prior techniques and devices for the determination of the neutron fluxes involved the activation of a variety of materials. Such activation techniques involve the exposure of a given material to the neutron flux for a fixed period. During this time nuclear reactions between the atoms of the material and the neutrons generate new nuclides, many of which are artifically radioactive. The radioactivity thus induced in the material is proportional to the time the material is irradiated and the intensity of neutron flow or the neutron flux. Materials such as manganese, cobalt, or copper, for example, are customarily used in the form of wires, pellets, coupons, or the like. They are positioned in the reactor and allowed to remain for a fixed period. These materials are then removed from the reactor core and the degree of activation is determined by measuring the gamma ray intensity, for example, of the material as a function of position in the core. The gamma activity at any point is proportional to the neutron flux which induced it.

This technique is not readily applicable to day to day operation of a nuclear reactor since the insertion and recovery of wires and the like ordinarily requires that the reactor vessel be opened and resealed. Particularly in a power reactor, the operating periods are ordinarily fixed by considerations other than the optimum irradiation of the activatable material, and of course the information on neutron flux level is not available continuously. In power reactors having large cores, such as more than about two feet in diameter, the movement of a given control rod in one region of the core can readily cause large variations in neutron flux, power level, and temperature in that region without extensively altering the overall power level of the reactor, and it is highly desirable to know immediately the resultant changes in neutron flux in the vicinity of such a rod.

Another technique for determination of neutron flux is one using an ionization chamber. Such a chamber is a sealed vessel containing at least two spaced electrodes and having an ionizable gas disposed in the space between them, the chamber operating in conjunction with some means for applying a potential between the electrodes, and a means for measuring current flow through the chamber as it varies with the intensity of radiation. Neutrons are uncharged and cannot directly cause ionization of the gas in the same way that the other forms of ionizing radiation such as alpha, beta, and gamma radiation do. There are in general three kinds of ion chmbers capable of indicating neutron fluxes. The first kind contains a low molecular weight gas such as deuterium, hydrogen, helium, methane, acetylene, ethylene, and the like. The neutrons react with the atoms of these gases by direct collision and produce ions from the gas atoms by recoil permitting a proportional current to flow in the ionized gas between th electrodes. A second kind of chamber utilizes an ionizable gas having atoms of large neutron capture cross section and which react more or less directly to produce high energy reaction products. One such gas is boron trifluoride. The boron may be the natural isotropic mixture, or it may be enriched in the highly reactive boron-10 isotope which has a very high neutron capture cross section. The capture reaction between boron and the neutrons present produces lithium-7 plus an alpha particle or helium ion. This ion causes further ionization in its passage through the gas thus permitting current to flow in proportion to the neutron flux. The third kind of chamber has been called a fission chamber since it conventionally includes a thin film of a fissionable material located on the surface of one of the electrodes. A typical fissionable material is uranium-235. It may be deposited by electroplating, sputtering in a high vacuum, or the like. Its exposure to a neutron flux induces nuclear fission of the uranium in proportion to the flux. The resultant high energy neutrons and fission products enter the ionizable gas adjacent the electrode creating gas ions and permitting a proportional current to flow through the chamber.

The application of ion chamber techniques to neutron flux monitoring throughout a nuclear chain reacting assembly has not heretofore been successful. Ion chambers sufficiently small to permit their disposition within the openings usually available in a chain reacting assembly have not been available, the approximate maximum diameter being something less than about 0.4 inch. The commercially available fission chambers, when tested in the intense radiation conditions existing in a reactor core, have been found highly unreliable apparently due to the non-uniformity and lack of physical ruggedness of the uranium or other fissionable film. The calibration of such ion chambers has been found to deteriorate rapidly due to activation of the materials used in constructing the chamber, burnup or other deterioration of the fissionable material film, as well as the effects of general changes in the properties of the insulation used in the chamber, connecting cables, and the like. An additional practical problem which must be faced by the user of these devices is the excessive cost of such items. This cost is a direct result of the great difficulty in manufacturing and assembling chambers of very small sizes, principally due to the large number of relative complicated parts in the conventional form of fission chambers.

It is a principal object of this invention to provide an ion chamber device for the measurement of neutron fluxes and which is capable of overcoming the above mentioned difficulties.

Another object is to provide an assembly of ion chambers of the fission chamber type having a considerably simplified design and a reduced number of parts, which is very rugged and reliable, and capable of registering neutron fluxes of high intensity accurately over long periods under the extreme conditions existing in production, propulsion, power, test, and other types of nuclear reactors.

Another object is to provide an ion chamber assembly of a particularly improved design for the continuous determination of neutron flux at a plurality of points in a region of intense neutron and gamma radiation.

An additional object is to provide an assembly including a plurality of ion chamber devices together with connecting cables integrally attached to each chamber, in combination with calibration means associated with the ion chambers and the cables in the assembly, the assembly being suitable for direct insertion into a nuclear chain reacting assembly for reliable and continuous measurement of neutron flux throughout at least one region in the chain reacting assembly.

Other objects and advantages of the present invention will become apparent to those skilled in the art as the description and illustration of this invention proceed.

Briefly, one aspect of this invention comprises an elongated ion chamber of the fission chamber type which has a relatively small diameter and consists of only seven individual parts. The fission chamber comprises an outer tube forming a container as well as one electrode of the fission chamber, an end plug integrally connected to one end of the outer tube, a cable collar having a central opening integrally connected to the other end of the outer tube, a relatively thick sleeve or insert of fissionable material disposed between the ends of the outer tube and supported on the inner surface of the outer tube, a pair of annular or ring-shaped insulators disposed within the outer tube at the ends of said sleeve, and a center cylinder having a longitudinal opening extending through it and supported between the insulators with its outer surface closely spaced apart from the inner surface of the sleeve and connected to the central conductor of the coaxial cable.

Another aspect of this invention comprises an elongated assembly including a plurality of fission chambers as above described spaced apart from one another along the assembly and adapted to be inserted into one end of an elongated channel extending through a nuclear chain reacting assembly or other extended region of high intensity radiation. This assembly comprises a longitudinal arrangement of fission chambers as above described together with their integrally attached cables combined together into a bundle with the individual chambers spaced apart from one another in the bundle adjacent one end of the assembly for a total distance approximately equal to that over which intelligence is required with respect to the neutron flux in the region to be monitored. The assembly includes a hollow calibration tube approximately the same size as the cables and extending from a closed and sealed end immediately adjacent the end-most fission chamber, along said assembly in the bundle of cables past all of the other fission chambers to some accessible point of termination outside the region to be monitored. The bundle formed from the individual cables and the calibration tube is hollow, being formed around and integrally connected to the exterior surface of each of a plurality of ferrules of relatively short length and which are spaced apart from one another along the length of the assembly. The resulting assembly is flexible and entirely free from external projections which can become lodged against projections or discontinuities in the interior surface of the channel into which the assembly is to be inserted.

The structure and the operation of the fission chamber and the fission chamber asembly of this invention will become more readily understood by reference to the accompanying drawing in which:

FIGURE 1 is a longtiudinal cross section view of the fission chamber of this invention, FIGURE 2 is a transverse cross section view of the device shown in FIGURE 1, FIGURE 3 is a longitudinal view of an assembly of fission chambers according to this invention including the calibration tube, the view being foreshortened for purposes of illustration, FIGURES 4 and 5 are transverse views of the fission chamber assembly shown in FIGURE 3, and FIGURE 6 is a simplified schematic wiring diagram of a circuit in which the fission chamber of this invention may be used to monitor neutron fluxes.

Referring now particularly to FIGURE 1, a longitudinal cross-sectional view of a device constituting one embodiment of this invention is shown. The ion chamber consists of an outer tube 10 which is integrally connected and sealed by means of circumferential weld 12 to end plug 14. It is welded at its opposite end by means of circumferential weld 16 to cable collar 18. End plug 14 contains a central opening 20 continuing into projecting tube 22. This tube is employed to evacuate gases from and admit a controlled atmosphere into the chamber during manufacture. The tube is pinched closed at 24 and sealed at its end by means of a weld 26. Cable collar 18 is provided with a central opening into which coaxial cable 28 is extended. At the inner end of cable connector 18 is provided a projection 30 which is integrally connected by means of weld 32 to the outer metallic jacket 34 of coaxial cable 28. The inner conductor 36 of the cable is insulated from the outer conductor by means of mineral insulation 38 which may be magnesium oxide, aluminum oxide, or the like.

Centrally located between the ends of outer tube 10 is sleeve 40. This sleeve is made of a fissionable metal or an alloy containing a fissionable metal, such as uranium-235, for example. The sleeve is supported at the position shown on the interior surface of outer tube 10 by means of a force fit, that is the normal outside diameter of sleeve 40 is slightly larger than the normal inside diameter of outer tube 10. Located at each end of sleeve 40 are annular insulators 42 and 44 made of a material such as high-fired aluminum oxide supported within outer tube 10. Between insulators 42 and 44 is center cylinder 46 which comprises the inner electrode of the chamber. The center cylinder is provided along its longitudinal axis with central opening 48 through which extends central conductor 36 of cable 28. Conductor 36 extends entirely through opening 48, terminates at the opposite end of center cylinder 46, and is electrically connected at that end by means of weld 50. The center cylinder is provided with cylindrical projections 52 and 54 extending coaxially from each of its ends as shown and into the central opening provided in each of annular insulators 42 and 44. The center cylinder 46 and the central conductor 36 are thus supported within the device of this invention.

The outside diameter of center cylinder 46 is made smaller than the inside diameter of sleeve 40 by a fixed amount providing an annular shaped gap 56 within which a controlled atmosphere consisting of a dry ionizable gas is maintained. As indicated previously this gas is introduced through tube 22 during manufacture of the device.

The manufacture of the device shown in FIGURE 1 is preferably conducted in the following manner. A portion of the exterior conductor 34 and insulation 38 is removed from the end of the coaxial cable leaving an extended portion of inner conductor 36. The cable is then inserted through cable collar 18 and weld 32 is made. Insulator 42 is then fitted by means of projection 52 to inner conductor 46 and this assembly is then fitted onto central conductor 36. The projecting end of the central conductor is next welded to the end of center cylinder 46 at 50 completing a first subassembly. Sleeve 40 is then pressed into outer tube 10 with a positioning push rod. The inside diameter of sleeve 40 is reamed to size. Insulator 44 is then inserted into the end of outer tube 40. End plug 14 is inserted into the end of outer tube 10 and secured by means of weld 12. The resulting second subassembly is then fitted around the center cylinder 46 of the first subassembly so that the end of the outer tube 10 slides into engagement with cable collar 18 and so that insulator 44 fits around projection 54. The subassemblies are joined completing the fission chamber with the making of circumferential weld 16.

A vacuum pump is connected to tube 22 and the chamber is evacuated. The chamber is then back-filled with the desired ionizable gas. Tube 22 is next pinched off at 24, the vacuum pump is disconnected, and a pin or plug is driven into the open end of tube 22. The end of the tube is finally welded shut and sealed at 26.

Referring now briefly to FIGURE 2 a transverse cross section view of the fission chamber of this invention as shown in FIGURE 1 is presented. This view shows at successively smaller radii outer tube 10, sleeve 40, gap 56, center cylinder 46 and its internal channel 48, and inner conductor 36.

Referring now particularly to FIGURE 3 a foreshortened view of an assembly of fission chambers according to this invention and their integral cables is shown. A pressure seal through which all of the cables pass is shown at 60, such seals being commercially available items and they will not be further described. The assembly consists of a plurality of fission chambers 62 of the type described in FIGURES 1 and 2. They are longitudinally spaced apart from one another in the assembly. Each chamber is provided with an integral cable 28 and the cables are formed together around the longitudinal axis of this assembly in the form of a bundle. Included in this bundle is an empty calibration tube 64 closed at its lower end 66 and extending with cables 28 past each and every fission chamber 62 in the assembly. The calibration tube penetrates pressure seal 60 with the cables 28 and is left open at its other end, not shown, beyond seal 60.

Immediately adjacent one end of each fission chamber 62 is a connecting band 86 which secures the fission chamber to the calibration tube, or to one of the other cables if desired. The plurality of cables and the calibration tube making up the bundle referred to are integrally secured to each other is a discontinuous fashion by means of a plurality of ferrules 70 spaced apart from one another along the length of the assembly as shown. These ferrules are hollow sections of tubing having a length of not less than about 1.0 and not more than about 10.0 times the ferrule tubing diameter. They are spaced apart from one another in the assembly by distances which are preferably more than about 100 and preferably less than about 1000 times the diameter of either cable 28 or calibration tube 64. The resultant assembly comprises a flexible yet strong bundle of conduits free from exterior projections and which can readily be inserted through an elongated channel, such as a tube, extending into and through the region in which neutron flux is to be measured.

In FIGURE 4 a transverse cross section of the assembly of FIGURE 3 is shown. In this figure four connecting cables 28 and a single calibration tube 64 are shown more or less uniformly surrounding ferrules 70 and to which each is connected, by means of braze metal 72, for example.

In FIGURE 5 an analogous view of the FIGURE 3 assembly is shown taken immediately below one of the fission chambers 62. The next adjacent ferrule 70 is not shown for reasons of clarity of illustration. Calibration tube 64 and three of the four cables 28 appear, and band 68 which secures the fission chamber 62 by means of tube 22 to calibration tube 64 is clearly shown.

In the case of assemblies according to this invention having a greater or fewer number of fission chambers and cables, the cross section views shown in FIGURES 4 and 5 would be modified to show a greater or fewer number of such items. These cables are in any event arranged in the most compact configuration possible along the central or longitudinal axis of the assembly.

Referring finally to FIGURE 6, a simplified schematic diagram of an electrical circuit as shown in which the fission chamber of this invention may be used. It should be understood that an individual circuit is connected to each fission chamber which may be used in an assembly as shown in FIGURE 3. The fission chamber itself is schematically illustrated at 62', its outer electrode being grounded by means of a ground return lead 80. The center cylinder is connected by means of lead 82, corresponding to inner conductor 36 in FIGURES 1 and 2, in series with resistors 84 and 86 with direct current power supply 88, the negative terminal of which is grounded by lead 90. In the circuit the resistance of the resistor 84 is relatively low compared to that of resistor 86. The purpose of resistor 86 is merely to prevent excessive loads being placed on power supply 88 in the event a short circuit occurs in fission chamber 62' or in its associated cable. In the absence of a neutron flux, no ions normally exist in ion chamber 62, there is no current flow through the chamber, and accordingly none flows through resistors 84 and 86. Indicating volt meter 92 connected across resistor 84 thus reads zero. Under these conditions the terminal potential of power supply 88 appears between the electrodes of fission chamber 62'. In the presence of the neutron flux, the fissionable material contained in chamber 62' undergoes nuclear fission reactions at a rate proportional to the flux, the contained gas ionizes to an extent proportional to the fission events, and a current flows in the circuit shown which is proportional to the extent of ionization. This current in flowing through resistor 84 generates therein a voltage differential which is indicated on volt meter 92 which is connected in parallel with resistor 84. This indicated voltage is thus proportional to the neutron flux.

*Example I*

The following data are given to illustrate the design and construction of a fission chamber as illustrated in FIGURE 1. The outer tube, end plug, cable collar, the center cylinder, and the exterior conductor or sheath and the inner conductor of the coaxial cable, are all fabricated from type 304 stainless steel. The mineral insulation in the cable is magnesium oxide. The insulators are high-fired aluminum oxide with their exterior surface ground to size. The sleeve of fissionable material is an aluminum-uranium alloy containing 15.8% by weight U–235, 1.2% U–238, and 93% by weight aluminum. The principal dimensions of the elements of this fission chamber are given below.

| Element: | Dimension (inches) |
| --- | --- |
| Outer tube— | |
|   Length | 2.00 |
|   Outer radius | 0.125 |
|   Radial thickness | 0.020 |
|   Inner radius | 0.105 |
| Fissionable sleeve— | |
|   Length | 1.00 |
|   Outside radius | 0.1052 |
|   Radial thickness | 0.007 |
|   Inner radius | 0.098 |
| Chamber gap—radial thickness | 0.013 |
| Center cylinder— | |
|   Outside radius | 0.085 |
|   Outside radius, projection | 0.030 |
|   Inside radius | 0.016 |
| Insulators— | |
|   Length | 0.266 |
|   Outside radius | 0.104 |
|   Inside radius | 0.031 |
| Coaxial cable—Outside radius | 0.0625 |

*Example II*

An assembly including three fission chambers as described in Example I, with their associated cables and a calibration tube 0.125 inch in outside diameter, was inserted into and tested under actual operating conditions in the Vallecitos Boiling Water Reactor near Pleasanton, California. The fission chambers in this assembly were spaced 12.0 inches apart center to center and were positioned in the 36 inch high core at elevations of 6, 18, and 30 inches from the bottom of the core. The overall length of the cable and chamber assembly was about 19 feet, the exterior end of the assembly being located in a terminal box at the upper end of the reactor vessel. This reactor was operated substantially continuously for a period of four months at thermal power averaging about 20 megawatts and at peak powers of about 30 megawatts. The average neutron fluxes monitored through the use in this period through the use of this invention ranging from $10^{13}$–$10^{14}$ neutrons per cm.$^2$ sec. After calibration in the manner described in Example III, the assembly of this invention continuously and reliably indicated the neutron flux distribution in the reactor. The sensitivity of the chamber was determined to be $1 \times 10^{-17}$ amperes per nv., and the chamber saturates at 40 volts when exposed to a flux of $5 \times 10^{13}$ nv.

*Example III*

The fission chamber and cable assembly described in Example II was calibrated in the manner described below. After insertion of the assembly into the reactor core, a titanium activation wire containing 1% copper was run through to the end of the calibration tube. The reactor was then allowed to operate at a power of about 20 megawatts for a period of 10.0 minutes during which time the neutron flux indicated by the instrumentation connected to each chamber was recorded. The wire was then withdrawn from the calibration chamber and allowed to cool for a period of 8 hours to permit the decay of titanium activity. A gamma traverse was made along the activated length of the wire, one inch sections of the wire being analyzed with a 256 channel analyzer. Back calculations were performed to determine the gamma activity at zero time, that is, the instant the cable was withdrawn from the proximity of the core. Using these figures the activating neutron flux was calculated for the 6, 18, and 30 inch elevations in the core, using the procedure described at pages 309–310 "Principles of Nuclear Reactor Engineering" by Glasstone. The sensitivity figure in amperes per nv. obtained from the calibration procedure are then used to adjust the values of the dropping resistors 84 so that the indicated flux is correct.

*Example IV*

In a nuclear power reactor moderator and cooled by boiling water and having a thermal rating of 680 megawatts, the reactor core consists of 488 fuel assemblies of square cross section each approximately 9 feet long and approximately 5 inches on a side. All but 16 of these assemblies contain 36 fuel rods approximately 0.5 inch in outside diameter and spaced approximately 0.75 inch apart center to center in a 6 by 6 square array. The nuclear fuel is 1.5% enriched uranium dioxide and the fuel rod clad and the flow channel surrounding each assembly is zircaloy. In the remaining 16 fuel assemblies, which are distributed throughout the reactor core, only 35 fuel rods are included, the 36th "rod" comprises an empty zircaloy instrumentation tube approximately the same size as a fuel rod. Into each of these 16 instrument tubes is extended an in-core flux monitor assembly containing four ion chambers spaced apart from one another at approximate elevations of 2.0, 4.0, 6.0, and 8.0 feet above the bottom of the reactor core. The length of each assembly is approximately 32 feet, the calibration tubes and cables terminating in a junction box atop the reactor vessel. At the exterior end of each of the 64 cables is attached a fission chamber power supply and neutron flux indicating instrumentation including amplifier, power supplies, and readout meters. This reactor is designed to operate at neutron flux levels on the order of about $10^{13}$ when liberating thermal energy at a rate of about 680 megawatts. Water, the natural isotopic mixture, mixture, flows at a rate of about 26.5 million pounds per hour through the reactor core and about 1.5 million pounds per hour are vaporized to form steam at 1,000 p.s.i. and 545° F.

The fissionable sleeve in the fission chamber of this invention may contain such fissionable materials as uranium-233, uranium-235, plutonium-239, and the like. The concentration of fissionable material in the sleeve may vary through the use of alloys of the above mentioned elements with such other elements as aluminum, zirconium, and the like, or through the use of compounds of these elements such as, for example, the oxides, carbides, and the like. The fissionable content may be varied depending upon the range of neutron fluxes to be measured. For low flux ranges, the fissionable atom content is preferably high, such as through the use of fully enriched uranium-235. For high flux ranges, the fissionable atom content may be lower, such as in the case of Example I given above in which the enrichment was about 16% uranium-235.

The radial thickness of the fissionable sleeve is preferably not less than about 0.003 inch; satisfactory thicknesses being in the range of from 0.005 to about 0.020 inch. Even the thinnest sleeves of 0.003 inch are still infinitely thick with respect to fission products, and only the innermost layers of material are effective in producing gas ionization and current flow. Variations in sensitivity due to non-uniformity of thickness of the fissionable material, a problem encountered in the conventional fission chambers, is completely overcome in the present invention.

The radial thickness of the gap between the fissionable sleeve and the center cylinder is preferably not less than about three times the eccentricity of the sleeve and the center cylinder, ordinarily about 0.003 inch, and preferably no greater than about 0.1 inch. With gaps below the minimum there has been found to be an increase in the tendency toward short-circuiting in the chamber. With gaps greater than the maximum given there has been found to be a tendency toward unreliability due to voltage breakdown within the chamber and the cable due to high applied voltage necessary. These limits have been found to be important considerations in insuring the highly reliable and accurate operation of the fission chamber of this invention.

In the chambers of this invention the ionizable gas may be nitrogen, argon, helium, or any of the non-radio active noble gases which have very low affinities for electrons. The gases, of course, should be dry, and passing the gas through a dehydration agent such as activated alumina, silica gel, activated charcoal, and the like will suffice without introducing extraneous impurities.

The pressure at which the ionizable gas is introduced is variable depending upon the desired sensitivity of the fission chamber and the anticipated neutron flux to which it will be exposed. In the devices described in Example I used to monitor neutron flux on the order of $10^{14}$, nitrogen at 3 p.s.i.g. is effective. For lower neutron fluxes higher gas pressures may be used, and vice versa.

Several particular embodiments of this invention have been described in considerable detail by way of illustration. It should be understood that various other modifications and adaptations thereof may be made by those skilled in this particular art without departing from the spirit and scope of this invention as set forth in the following claims.

We claim:

1. An ion chamber assembly which comprises a plurality of ion chambers, a plurality of cables, one each of said cables being integrally attached to one of said chambers, said cables being combined together into a bundle with the individual chambers spaced apart from one another in the assembly adjacent one end thereof, and a calibration tube having a closed and sealed end disposed immediately adjacent the end-most ion chamber in the assembly and extending along said assembly in said bundle past and immediately adjacent each of the other ion chambers to an open end at the opposite end of said assembly.

2. An ion chamber assembly which comprises a plurality of ion chambers, a plurality of cables, one each of said cables being integrally attached to one of said chambers, said cables being combined together into a bundle with the individual chambers spaced apart from one another in the assembly adjacent one end thereof, a calibration tube having a closed and sealed end disposed immediately adjacent the end-most ion chamber in the assembly and extending along said assembly in said bundle past and immediately adjacent each of the other ion chambers to an open end at the opposite end of said assembly, and a plurality of ferrules spaced apart from one another along the length of said assembly, said bundle of cables and the calibration tube being formed around and integrally connected to the exterior surfaces of said ferrules, said assembly thus being flexible and free from external projections.

3. An ion chamber assembly according to claim 2 wherein said ferrules are hollow sections of tubing having a length of between about 1.0 and about 10 times the tubing diameter, and are spaced apart from one another in said assembly by distances between about 100 and about 1000 times the diameter of the cable in said assembly.

4. An ion chamber assembly which comprises a plurality of ion chambers, a plurality of cables, one each of said cables being integrally attached to one of said chambers, said cables being combined together into a bundle with the individual chambers spaced apart from one another in the assembly adjacent one end thereof, a calibration tube having a closed and sealed end disposed immediately adjacent the end-most ion chamber in the assembly and extending along said assembly in said bundle past and immediately adjacent each of the other ion chambers to an open end at the opposite end of said assembly, said ion chambers each comprising an outer tube, an end plug integrally connected to one end of said outer tube, a cable collar integrally connected to the other end of said outer tube, a sleeve of fissionable material disposed on the inner surface of said outer tube, a pair of annular shaped insulators disposed within said outer tube at the ends of said sleeve, and a center cylinder supported between said insulators with its outer surface closely spaced apart from the inner surface of said sleeve.

5. An ion chamber assembly which comprises a plurality of ion chambers; each ion chamber comprising an outer tube forming a container and one electrode of said chamber, an end plug integrally connected to and sealing one end of said outer tube, a cable collar integrally connected to and sealing the other end of said outer tube, a sleeve of fissionable material disposed between the ends of said outer tube and supported on the inner surface thereof, a pair of annular-shaped insulators spaced apart from one another at the ends of said sleeve and within said outer tube, and a center cylinder forming the other electrode of said chamber and having a longitudinal opening therethrough and supported by and between said insulators with its outer surface closely spaced apart from the inner surface of said sleeve; a plurality of coaxial cables, one each of said cables extending through a central opening in the cable collar in each ion chamber with the outer sheath of said cable being electrically connected and sealed to said collar and with the inner conductor extending from one end through said longitudinal opening in said center cylinder and being electrically connected to the opposite end thereof, said cables being combined together into a bundle with said plurality of ion chambers spaced apart from one another in the assembly adjacent one end thereof; and a calibration tube having a closed and sealed end disposed immediately adjacent the end-most ion chamber in said assembly and extending along said assembly in said bundle past and immediately adjacent each of the other ion chambers to an open end at the opposite end of said assembly.

References Cited in the file of this patent

UNITED STATES PATENTS

| 2,408,230 | Shoupp | Sept. 24, 1946 |
| 2,506,149 | Herzog | May 2, 1950 |
| 2,508,772 | Pontecorvo | May 23, 1950 |
| 2,719,823 | Zinn | Oct. 4, 1955 |

OTHER REFERENCES

Neutron, Gamma Measurements for In-Pile Power Monitoring, by Lapsley, Nucleonics, February 1958, pages 106, 108 and 110.